Patented Nov. 21, 1950

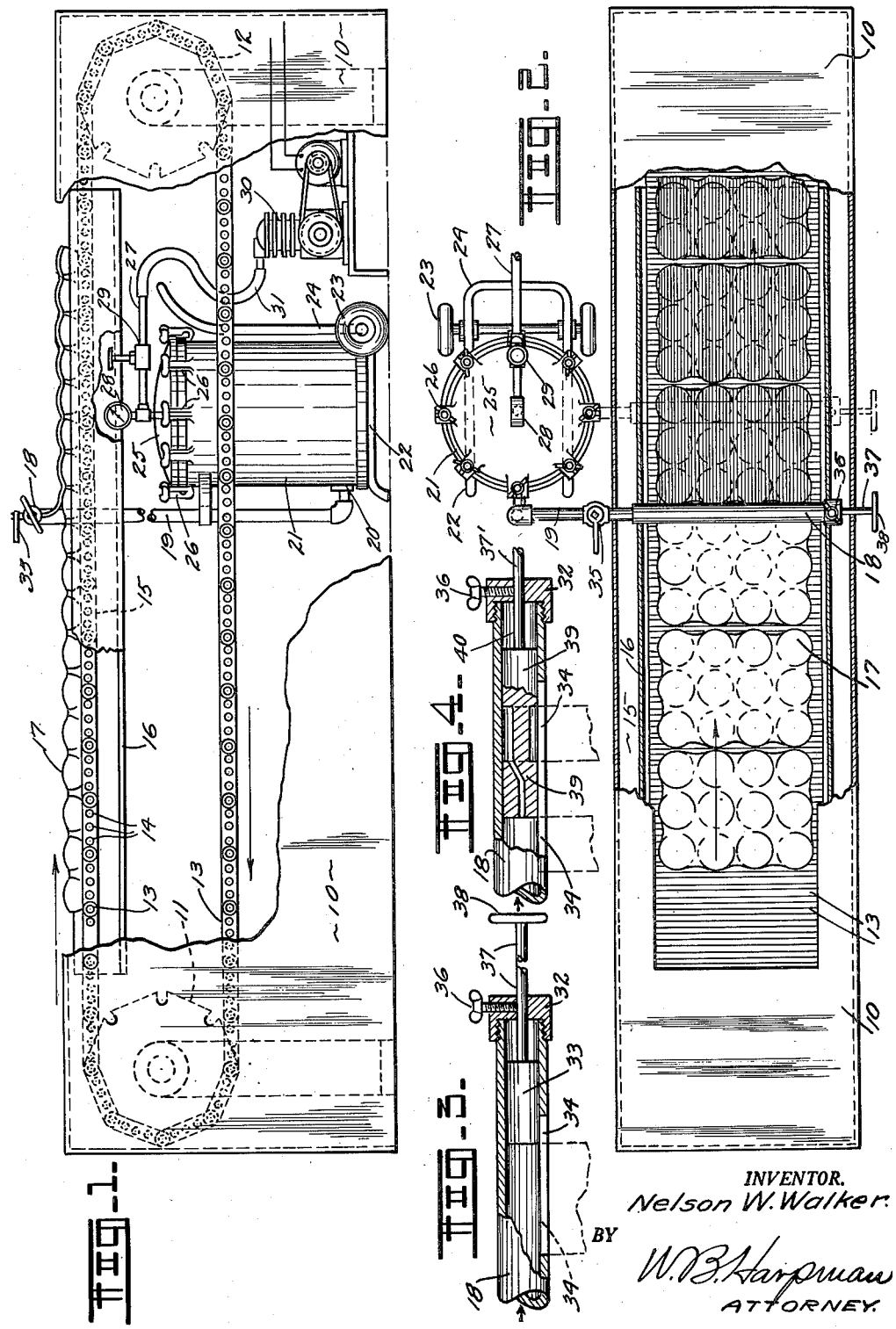

2,531,093

UNITED STATES PATENT OFFICE 2,531,093

ICER FOR BAKERY PRODUCTS

Nelson W. Walker, Youngstown, Ohio

Application October 8, 1948, Serial No. 53,580

2 Claims. (Cl. 91—3)

This invention relates to icing machines and more particularly to icing machines having variable discharge orifices for applying icing to various bakery products and the like.

The principal object of the invention is the provision of a machine for applying icing to bakery products.

A further object of the invention is the provision of a portable machine for applying icing to bakery products.

A still further object of the invention is the provision of a combination conveyor for bakery goods and an icer for applying icing to bakery goods on the said conveyor.

A still further object of the invention is the provision of a simple and efficient means of applying icing to various bakery products.

A still further object of the invention is the provision of means for applying icing to bakery products and controllable as to the width and number of the sheet of icing so applied.

The icing machine shown and described herein comprises essentially the combination of a conveyor adapted for handling bakery products such as rolls, cakes and the like whereby the said products may be moved passed a given point at a predetermined rate and a device for applying a continuous ribbon-like sheet of icing to the said bakery products on the said conveyor. The icing machine portion of the device is so arranged that the icing may be delivered in a ribbon-like sheet of any desired width or in a plurality of ribbon-like sheets of desirable width.

Among the more important objects of the invention, that of applying a uniform coating of icing to the various bakery products, will be recognized by those skilled in the art as particularly desirable. Additionally, the object of speeding up the icing step in the production of various iced bakery goods is important and the device disclosed herein meets these objects and produces superior iced bakery goods in that the icing is of uniform thickness and covers the entire bakery product including the irregular surface contours thereof in a highly desirable manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side elevation of the icer for bakery products with parts broken away and parts in cross section.

Figure 2 is a top plan view of the icer for bakery products shown in Figure 1.

Figure 3 is an enlarged detail view of a portion of the icer shown in Figures 1 and 2.

Figure 4 is an enlarged detail view with parts broken away and parts in cross section illustrating an alternate icing discharging nozzle.

By referring to the drawings and Figures 1 and 2 in particular it will be seen that a bakery products conveyor has been disclosed and includes a housing 10 enclosing spaced conveyor actuating members 11 and 12, respectively, which have an endless conveyor 13 trained thereover, the conveying surface of which comprises a plurality of transversely extending metal rods 14 arranged in closely spaced relation. The housing 10 and the conveyor supporting and moving means 11 include spaced parallel tracks 15 in which the conveyor 13 travels. The housing 10 includes a longitudinally extending pan 16 arranged underneath the upper portion of the conveyor 13 and forms a means for catching crumbs from the bakery products placed on the conveyor or icing deposited thereon as the case may be. In Figures 1 and 2 of the drawings bakery products 17 are illustrated in position on the conveyor 13 and arrows indicate the movement of the conveyor. The description of the conveyor herein given will be recognized by those skilled in the art as relating to more or less conventionally styled bakery goods conveyors.

In connection with the bakery goods 17 on the conveyor 13 it will be observed that they are arranged in end to end relation with a minimum of space therebetween so that they will pass in a continuous line beneath an icing nozzle 18 positioned transversely of the conveyor 13. The nozzle 18 is supported by means of a tubular member 19, a portion of which is horizontally disposed and a portion of which is vertically disposed. The lowermost end of the vertical portion of the tubular member 19 is in communication with an orifice 20 in the lower part of a cylindrical container 21. The cylindrical container 21 is a pressure vessel mounted on a supporting frame 22 and includes a pair of spaced wheels 23 lending portability thereto, a vertical handle 24 being provided on the wheels 23 so that the container 21 may be conveniently moved as desired.

The upper end of the container 21 is provided with a closure 25 and the closure is retained in tight relation on the container 21 by means of a plurality of radially spaced clamps 26. The closure 25 is removable from the container 21 by loosening the clamps 26. An air pressure line 27 communicates with an orifice in the closure 25 and incorporates a pressure gauge 28 and a manually adjustable pressure regulator 29. The air pressure line 27 is placed in communication with a suitable source of compressed air such as an air compressor 30 which may be remotely located, if desired, by means of a suitable connecting medium such as a flexible hose 31.

The tubular nozzle 18 may be seen in enlarged cross sectional detail in Figure 3 as well as in operative relation to the conveyor 13 and the bakery products 17 thereon in Figures 1 and 2 and by referring to Figure 3 of the drawings it will be seen that the tubular nozzle 18 comprises a cylindrical member having a closure 32 at one end and a piston 33 slidably positioned therein. The nozzle 18 has a longitudinally extending slot 34 formed in the bottom thereof through which icing is discharged in a ribbon-like sheet. The icing is delivered into the tubular nozzle 18 from the tubular member 19 and through a control valve 35, as best shown in Figures 1 and 2 of the drawings. Upon entering the tubular nozzle 18, the icing will flow outwardly therefrom through the restricted orifice defined by the longitudinally extending slot 34, it being observed that the effective length of the slot 34 may be controlled by moving the piston 33 longitudinally within the tubular nozzle 18 and securing it in desired position with suitable means such as a set screw 36 threadably engaging an opening in the tubular nozzle 18 and bearing against a portion of a rod 37 which in turn extends outwardly through an opening in the closure 32 and has a handle 38 formed on the outermost end thereof.

It will thus be seen that when rolls, such as are commonly baked in group-like units of twelve connected rolls, are to be iced they are placed in end to end relation on the conveyor 13 and moved thereby beneath the tubular nozzle 18, the piston 33 being adjusted to vary the effective length of the slot 34 in the nozzle 18 whereby a ribbon-like sheet of icing is deposited on the rolls as they pass in under the nozzle. The mounting and arrangement of the tubular nozzle 18 with respect to the container 21 will be seen to provide a desired degree of flexibility with respect to the adjustment of the nozzle 18 and in relation to the positioning, size, shape, etc., of the bakery products 17 on the conveyors 13.

At such times as parallel rows of bakery products are to be iced, the piston 37 is removed from the tubular nozzle 18 and a modified piston 39 substituted therefor as may best be seen in Figure 4 of the drawings. The modified piston includes a plurality of piston-like units spaced with respect to one another in an adjustable manner on a rod 40 and the assembly is in turn arranged for longitudinal movement within the tubular nozzle 18. Several of the piston-like members 39 are bored longitudinally so that icing introduced into one end of the nozzle 18 will flow through at least one of the piston-like members 39 while the piston itself blocks a portion of the slot 34 in the tubular nozzle. It will thus be seen that a plurality of parallel ribbon-like sheets of icing will be discharged from the nozzle thereby insuring the parallel rows of bakery products to be properly iced as they pass beneath said nozzle.

It will thus be seen that a simple and efficient icer for bakery products has been disclosed which meets the several objects of the invention.

Having thus described my invention, what I claim is:

1. In an icing machine for bakery products, a pressure vessel and an elongated tubular icing discharge nozzle in communication therewith and means for applying pressure to the said pressure vessel whereby icing may be moved therefrom through the said discharge nozzle, the said discharge nozzle having a longitudinally extending slot in the lower part thereof and a multiple headed piston in the said discharge nozzle for movement therealong for blocking the said slot at spaced intervals, passageways through at least one of said piston heads whereby spaced icing discharge outlets are formed in said slot.

2. In an icer for bakery products a tubular nozzle, a source of icing in communication with said tubular nozzle and means for moving said icing from the said source through the said nozzle, a longitudinally extending slot in said nozzle, and a multiple headed piston disposed in said tubular nozzle, the said multiple heads of said piston being spaced with respect to one another and some of the said heads being drilled longitudinally whereby icing may be delivered to the said slot at spaced intervals therealong between the said spaced heads of the multiple piston, and the multiple heads of the piston serve to block the said slot at spaced intervals therealong.

NELSON W. WALKER.

REFERENCES CITED

The following references are of record in the file of this patent:

UNITED STATES PATENTS

| Number | Name | Date |
| --- | --- | --- |
| 1,390,367 | Massey | Sept. 13, 1921 |
| 1,518,307 | Cooke | Dec. 9, 1924 |
| 1,804,735 | Barnes et al. | May 12, 1931 |
| 2,320,529 | MacManus | June 1, 1943 |
| 2,431,029 | Duffy | Nov. 18, 1947 |